Nov. 1, 1932.  D. D. GOLDBERG  1,886,007
VALVE
Filed Jan. 16, 1932
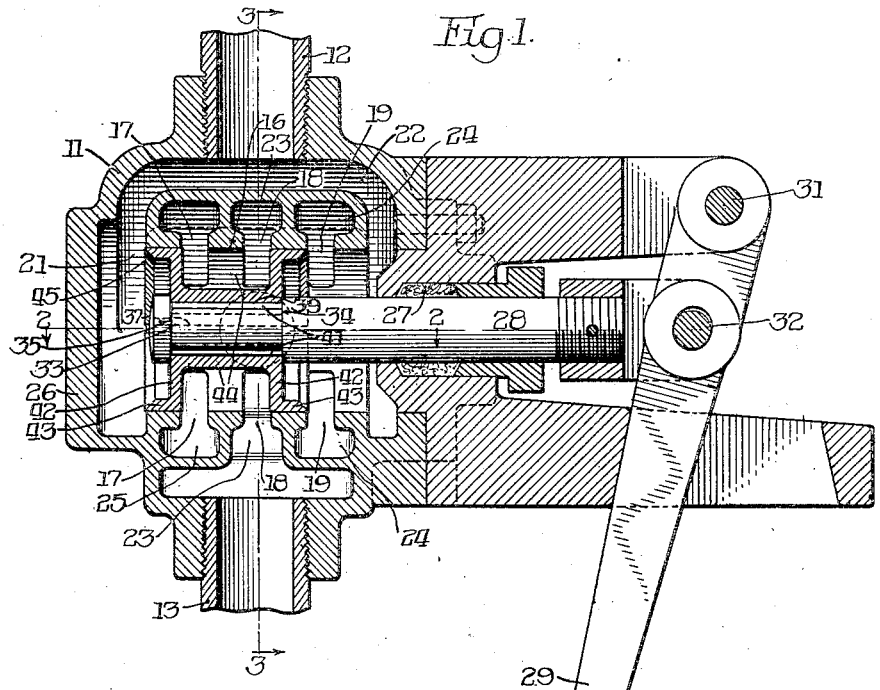
Fig.1.
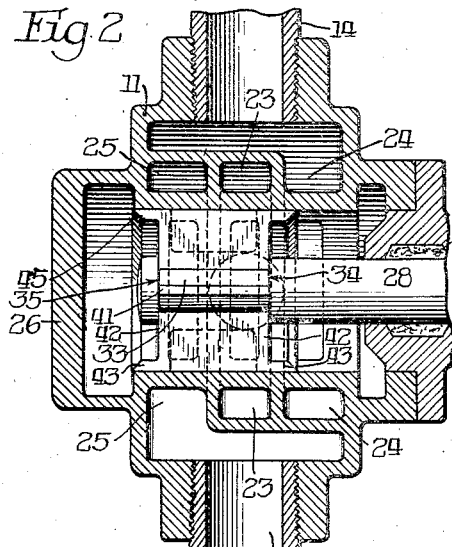
Fig.2.
Fig.4.
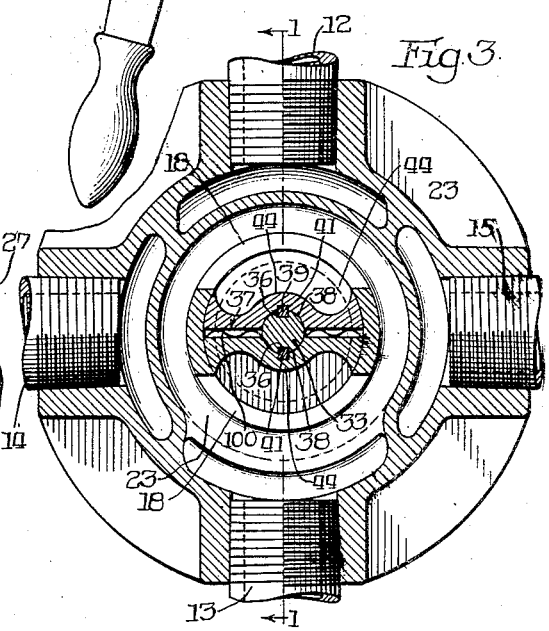
Fig.3.
Inventor:
David D. Goldberg
By Walter M. Fuller atty.

Patented Nov. 1, 1932

1,886,007

UNITED STATES PATENT OFFICE

DAVID D. GOLDBERG, OF CHICAGO, ILLINOIS

VALVE

Application filed January 16, 1932. Serial No. 587,008.

My invention relates to valves and concerns more particularly or especially improved and novel means for maintaining the valves tight and in non-leaking condition by the pressure of the fluid controlled or regulated by the valve.

The invention pertains more specifically to four-way or similar valves which control the action of fluid or liquid under at least two different pressures, the higher pressure being used to seal the valve against leakage.

The invention is susceptible of satisfactory and efficient incorporation in sliding valves having reciprocatory plungers to open and close the connections or conduits through the valve casing, and the sealing feature referred to comprises the splitting of such plunger lengthwise into two or more parts, thereby affording access of the fluid pressure between such plunger sections to force or press them outwardly against their seats on the inner side or surface of the cylinder in which they slide to change or modify the connections through the valve.

Not only is substantial leakage thus precluded or overcome, but, in case grit or other foreign matter should become lodged between any such plunger or valve section and the cylinder in which it slides, the valve part can temporarily yield inwardly, thus avoiding becoming seized and immovably bound in the valve casing or cylinder.

To enable those skilled in this art to understand the invention fully, both from structural and functional standpoints, in the accompanying drawing, forming a part of this specification, a present, preferred embodiment of the invention has been presented in detail, and, for simplicity, like reference numerals have been used throughout the several views to designate the same parts.

In this drawing:—

Figure 1 is a longitudinal section through the improved valve;

Figure 2 is a fragmentary, longitudinal section on line 2—2 of Figure 1;

Figure 3 is a cross-section on line 3—3 of Figure 1; and

Figure 4 is a perspective view of one of the two separable or expansible valve members.

By reference to this drawing, it will be observed that the valve-casing 11 has a top opening fitted with a pipe 12, a bottom aperture equipped with a pipe 13, a side passage having a pipe 14, and an opposite side orifice provided with a pipe 15.

Centrally, the casting 11, which is of somewhat peculiar structure or formation, has a longitudinally-disposed, cylindrical bearing 16 open at its opposite ends and having two opposite sets of three parallel, arcuate ports 17, 18, and 19.

It will be observed from what follows that the open ends of the cylinder or bearing operate or function as ports.

Pipe 12, which may be called the power conduit, is ordinarily connected to a source of fluid, such as water, under substantial pressure, and, in the valve structure, it is joined to the two opposite open ends or ports of the cylinder 16 by passages 21 and 22.

Pipe 13, which is usually connected to the sewer, is joined to the two arcuate ports 18, 18 by a surrounding annular chamber 23.

Pipe 14, which is customarily connected to the top of a cylinder equipped with a sliding piston, neither of which is shown, is joined by a circular chamber 24 to the two aligned ports 19, 19.

And, similarly, pipe 15, which is designed and adapted to be connected to the lower part of the unillustrated cylinder mentioned immediately above, is in like manner united, by means of a round chamber 25, with the pair of registering ports 17, 17.

One end of the valve-casing 11 is closed by its wall 26, but the opposite wall is equipped with a stuffing-box 27 through which slides a rod or shaft 28 reciprocated by a rocking-handle 29 fulcrumed at 31 and operatively connected to the end of the rod at 32.

Any other manual or power operated means may be used for sliding the rod as occasion or circumstances dictate.

Inside of the valve-casing 11, such rod has a reduced-diameter section 33 terminating in square shoulders 34, 35 and having longitudinal key-ways 36, 36 (Figure 3) located 180° apart.

Such portion of the shaft is fitted with two complementary or companion valve-segments, each of the shape shown in Figure 4, having a plane or flat inner surface 37 which at its center has a nearly semi-cylindrical bearing 38 equipped with a key-way 39.

The two bearings 38, 38 of the pair of valve-segments are of substantially the same diameter as that of the smaller part of the rod over which they fit, as shown in Figure 3, with their key-ways in register with those of the rod, so that the two valve parts may be held on the rod against turning by two keys 41, 41 accommodated in the mating or matching key-ways, as depicted.

By leaving a slight looseness or play between such keys and their associated key slots, the valve-sections may move in or out from their rod, as occasion may require.

At each end, each valve-section has a semi-cylindrical enlargement 42, equipped with a semi-circular flange 43, so that the intermediate portion of the member has a central, external cavity 44.

The advance edge of each flange is beveled at 45 to assist in keeping the bearing surface 16 free from the accumulation of foreign matter, grit, etc.

As is clearly presented in the figures of the drawing, especially Figures 2 and 3, the mating valve-members are spaced apart a small distance so that the fluid or liquid under pressure at the two ends of the sectional valve finds easy entrance between them, it being clear that the keys 41, 41 maintain the valve-elements in proper register or alignment with the ports which they control.

When such sectional valve is in the position shown in Figure 1, the liquid under relatively high pressure from the power pipe 12 has access to both ends of the valve and fills the space between the two valve parts, thus holding them effectively separated against their respective portions of the bearing 16 to maintain adequate seals against the escape of the liquid.

Such water under high pressure flows out through ports 19, 19, chamber 24, and pipe 14 into the top of the cylinder referred to, but not shown, to force its piston down to perform whatever work is required of it.

The water or other liquid or fluid from the bottom of such undisclosed cylinder escapes through pipe 15, chamber 25, ports 17, 17, valve chambers 44, ports 18, 18, chamber 23, and pipe 13 to the sewer.

Owing to such connection to the sewer, the pressure of that water or other fluid is substantially less than that between the valve-sections, and thus the liquid at greater pressure is employed to seal against leakage that portion of the valve controlling and governing the flow of liquid of lesser pressure, as well as that part controlling the liquid at the higher pressure.

This construction or plan of employing the greater pressure to perform this function in relation to the lesser pressure is believed to be broadly new.

When the valve, by means of handle 29, or any other type of operating means, manual or automatic, is shifted to the right, as viewed in Figure 1, the valve will be maintained expanded by the same liquid pressure between its parts, and in its final position power pipe 12 will be connected to the cylinder bottom pipe 15 and the cylinder top pipe 14 will be joined to the sewer-pipe 13, as will be readily understood.

As will be perceived, the liquid of greater pressure from power pipe 12 is always active between the valve-members to keep them properly expanded and pressed against the bearing 16 to preclude the occurrence of leakage.

Thus the valve, while governing and regulating the flow of a liquid under two pressures, which may differ from one another in substantial degree, at all times employs the liquid of greater pressure to perform the valve-expanding action to insure the non-occurrence of leakage past any part of the valve, the construction, nevertheless, permitting either valve-member to yield momentarily inwardly, if by chance foreign matter should become lodged between such valve-section and its bearing, thus eliminating the possibility of damage or injury to the valve from this source.

The invention as herein described and illustrated and set forth in the appended claims is not limited to the details of construction presented, and many minor or more or less radical changes or modifications may be incorporated in the structure without departure from the heart and essence of the invention and without the loss of any of its substantial benefits.

Although I have herein indicated the employment of the greater of the two liquid pressures for maintaining the sliding valve in expanded or enlarged condition, it will be clear that the lesser of the two pressures may be used for this purpose if such a structure and function becomes desirable.

In some instances, it may be desirable to use a spring or springs 100 shown in Figure 3 to hold the valve sections separated in case the fluid under pressure is cut off from access to the interior of the valve, so that when the fluid or liquid is again introduced into the valve, the latter will perform its functions satisfactorily.

I claim:

1. In a valve, the combination of a valve-casing having four external openings and a cylinder with ports connected by passages to said openings, a longitudinally-divided valve slidable in said cylinder to change said port connections, and means to slide said valve in said cylinder, the space between the valve-sections being constantly in connection with said passage united to a specific one of said openings, whereby the fluid under pressure entering the valve-casing through such openings tends to expand said valve against the walls of said cylinder to prevent leakage.

2. In a valve, the combination of a valve-casing having four external openings and a cylinder with ports connected by passages to said openings, an operating rod extending to the outside of said casing, means to reciprocate said rod, and a longitudinally-divided valve on said rod and slidable by said rod in said cylinder to change said port connections, the space between the valve sections being constantly in connection with said passage united to a specific one of said openings, whereby the fluid under pressure entering the valve-casing through such opening tends to expand said valve against the walls of said cylinder to prevent leakage.

3. In a valve, the combination of a valve-casing having four external openings and a cylinder having three ports connected by passages to three of said openings, both ends of said cylinder being open and connected by passages to said fourth opening, an operating rod extending through the wall of said valve-casing, means to reciprocate said rod, and a longitudinally-divided valve on, and slidable in said cylinder by, said rod to change said port and cylinder open-end connections, the space between the valve-sections being constantly subject to the pressure in said end passages to said fourth opening tending to expand said valve against the walls of said cylinder to prevent leakage.

4. In a valve, the combination of a valve-casing having four external openings and a cylinder with both ends open and connected by passages to one of said openings, said cylinder having two groups of three ports each with lengthwise unported surfaces between said groups, each pair of corresponding ports of both groups being connected by passage means to the correlated opening, a longitudinally-divided valve slidable in said cylinder to control said ports and to open and to close the cylinder ends, and means to reciprocate said valve, the valve-sections being separated to permit the fluid pressure at the cylinder ends to have access between them tending to expand the valve against said cylinder walls to preclude leakage, the space between the valve-sections being in register with said unported surfaces of said cylinder.

5. In a valve, the combination of a valve-casing having a plurality of external openings and a cylinder with ports connected by passages to the respective external openings, whereby the valve is adapted to control the flow of fluids therethrough at two different pressures, a longitudinally-divided valve slidable in said cylinder to change said port connections, and means to slide said valve in said cylinder, said valve having means to maintain the space between the valve-sections in constant connection with the passage united to a specific one of said openings, whereby the fluid in said passage tends to expand said valve against the walls of said cylinder to prevent leakage.

In witness whereof I have hereunto set my hand.

DAVID D. GOLDBERG.